(12) United States Patent
Pearson et al.

(10) Patent No.: US 12,275,593 B2
(45) Date of Patent: Apr. 15, 2025

(54) PAYLOAD TRANSPORT CARRIER

(71) Applicants: Jack Pearson, Pacheco, CA (US); William Pearson, Pacheco, CA (US)

(72) Inventors: Jack Pearson, Pacheco, CA (US); William Pearson, Pacheco, CA (US)

( * ) Notice: Subject to any disclaimer, the term of this patent is extended or adjusted under 35 U.S.C. 154(b) by 52 days.

(21) Appl. No.: 18/183,058

(22) Filed: Mar. 13, 2023

(65) Prior Publication Data
US 2023/0286755 A1 Sep. 14, 2023

Related U.S. Application Data

(60) Provisional application No. 63/319,241, filed on Mar. 11, 2022.

(51) Int. Cl.
*B65G 17/32* (2006.01)
*B65G 17/36* (2006.01)
*B65G 47/38* (2006.01)

(52) U.S. Cl.
CPC .......... *B65G 17/323* (2013.01); *B65G 47/38* (2013.01)

(58) Field of Classification Search
CPC ...... B65G 17/323; B65G 17/32; B65G 17/36; B65G 17/04; B65G 47/38
USPC ................................................. 198/680, 715
See application file for complete search history.

(56) References Cited

U.S. PATENT DOCUMENTS

| | | | | |
|---|---|---|---|---|
| 3,045,807 A * | 7/1962 | Fioravanti | ............. | B65G 47/57 |
| | | | | 198/802 |
| 6,164,440 A * | 12/2000 | Van Bree | ............. | B65D 19/44 |
| | | | | 198/860.3 |
| 7,150,374 B1 * | 12/2006 | Camps | ............. | B65D 25/04 |
| | | | | 206/583 |
| 7,422,517 B2 * | 9/2008 | Criscione, II | ...... | A22C 21/0007 |
| | | | | 452/187 |
| 7,762,754 B2 * | 7/2010 | Maetaki | ............. | B66C 1/36 |
| | | | | 212/331 |
| 8,187,062 B2 * | 5/2012 | Criscione, II | ...... | A22C 21/0007 |
| | | | | 452/188 |
| 8,684,431 B2 * | 4/2014 | Setozaki | ............. | B65B 43/465 |
| | | | | 198/465.4 |
| 9,187,252 B2 * | 11/2015 | Wend | ............. | B65G 17/12 |
| 9,828,182 B2 * | 11/2017 | Schoenenberger | .. | B65G 17/485 |
| 10,370,179 B2 * | 8/2019 | Schneuing | ............. | B65G 17/20 |
| 10,875,716 B2 * | 12/2020 | Schönenberger | ...... | B65G 9/002 |
| 11,072,466 B2 * | 7/2021 | Wend | ............. | B65D 33/1658 |
| 11,299,350 B2 * | 4/2022 | Fenile | ............. | B65G 9/002 |
| 11,352,216 B2 * | 6/2022 | Reischl | ............. | B65G 19/025 |

* cited by examiner

*Primary Examiner* — Douglas A Hess
(74) *Attorney, Agent, or Firm* — West & Associates, A PC; Stuart J. West; Charlotte Rodeen-Dickert

(57) ABSTRACT

Disclosed is an apparatus that can transport a payload (e.g., a parcel, package, box, bag) from one position in a facility to any other point via conveyance on an overhead track system. It can be used to move a payload from the warehousing portion of the facility to the shipping area but can also transport to a value-add station where additional labor/material(s) can be added to the payload or any other destination required. It can also be loaded at most any location due to the small footprint of the induction stations to be brought to shipping or back to warehousing.

13 Claims, 11 Drawing Sheets

PAYLOAD TRANSPORT CARRIER

CROSS-REFERENCE TO RELATED APPLICATION(S)

This application claims the benefit of priority to prior-filed and co-pending U.S. Provisional Patent Application Ser. No. 63/319,241 filed Mar. 11, 2022, the complete contents of which is hereby incorporated herein by reference.

BACKGROUND

Technical Field

The present device relates to the field of payload conveyance devices, particularly those used in parcel packing and shipping.

Background

Robotic systems for package/payload transport within a facility are commonplace. However, such systems usually require significant amounts of infrastructure for the loading and/or unloading areas. Existing ground-based systems typically require large footprints at both ends, while existing overhead systems require either a person or substantial mechanical systems to unload packages/payloads. What is needed is a payload transport carrier system that is adapted and configured to be loaded easily in a small space and then be unloaded predictably straight down relative to the carrier using minimal equipment into a small space. This allows the loading and unloading areas to be placed wherever needed within a facility.

SUMMARY

The present device can transport a payload (e.g., a parcel, package, box, bag) from one position in a facility to any other point via conveyance on an overhead track system. For example, it can be used to move a payload from the warehousing portion of the facility to the shipping area but can also transport to a value-add station where additional labor/material can be added to the payload or any other destination required. It can also be loaded at most any location due to the small footprint of the induction stations to be brought to shipping or back to warehousing.

Each payload can also be scanned before being loaded into the carrier to match a payload to a carrier ID. Control software can set the destination, and a carrier can be conveyed along an overhead track, most likely through a series of switches, to reach a destination. Once over a destination, a small tripper arm, attached to the track or nearby support structure, can extend to engage a latch on the carrier to release the payload to simply drop or drop into a target, such as a box, chute, or receptacle. The carrier can then move through a closing station to reset the latches and can route to a staging/storage area to queue for deployment to another induction station.

BRIEF DESCRIPTION OF THE DRAWINGS

Further details of the present device are explained with the help of the attached drawings in which.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1A:
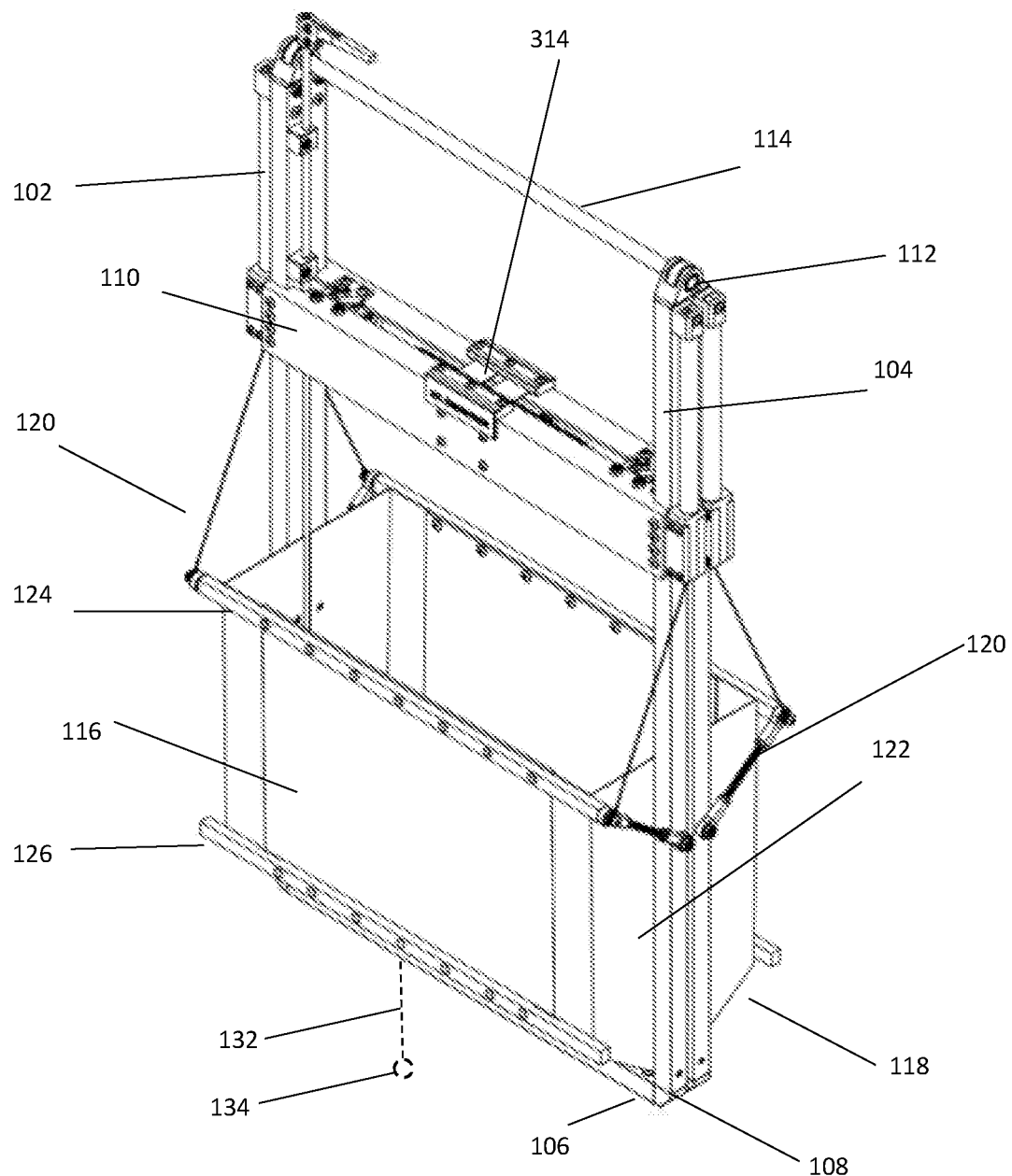
FIG. 1a depicts a perspective view of an embodiment of the present device. in a first configuration.

FIG. 1a depicts a perspective view of one embodiments of the present device 100 in a first configuration. As shown in FIG. 1a, a first configuration can be "loaded and closed". In some embodiments the device 100 can comprise a substantially matching pair of frames 102 wherein each frame 102 can be comprised of a pair of vertical members 104 each having a first end and a second end. For each frame 102, a horizontal member 106 can connect the first ends of said vertical members 104 to form a substantially orthogonal U-shaped frame 102. The first ends of vertical members 104 can be removably connected to each end of a horizontal member 106 via inserts 108 riveted into the corners for each frame, a welded or bent corner, or with any other known, convenient and/or desired fastener.

In some embodiments, a frame 102 can be comprised of tubing having a substantially square cross-section, but in other embodiments can have any other known, convenient and/or desired configuration. A frame 102 can have a substantially orthogonal U-shape measuring approximately 31 inches tall and 18 inches wide, but in other embodiments can have any other known, convenient and/or desired dimensions.

As shown in FIG. 1a, a channel 110 can be removably connected, temporarily affixed and/or permanently affixed substantially horizontally between two vertical members 104. A channel 110 can have a substantially rectangular cross-section or, in alternate embodiments, any other known, convenient and/or desired geometry. In some embodiments, a channel 110 can be approximately 2.5 inches tall, but in other embodiments can have any other known, convenient and/or desired dimension(s). In some embodiments, a channel 110 can be removably connected, semi-permanently affixed or permanently affixed horizontally between vertical members 104. In some embodiments, a channel 110 can be riveted approximated 21 inches above a horizontal member 106, but in other embodiments can be connected by any other known, convenient and/or desired fastener and any other known, convenient and/or desired height above a horizontal member 106.

Frames 102 can be removably connected at the second ends of vertical members 104 to form a hinge joint. In some embodiments, a hinge component 112 can be removably connected to the second end of each vertical member 104. As shown in FIG. 1a, a hinge pivot member 114 can be run through the hinge components 112 on each frame 102 to removably connect the two frames 102 together, forming an upside-down V shape from the side, with the channel 110 openings facing one another. A hinge pivot member 114 can also provide a connection point to any known, convenient and/or desired overhead track system, wherein, in some alternate embodiments the connection designs can be employed to operate with the track system to which it is connecting.

In some embodiments, frames 102, inserts 108, channels 110, hinge components 112 and a hinge pivot member 114 can be comprised of aluminum or steel, but in other embodiments can be comprised of any another metal, polymer, or any other known, convenient and/or desired material and/or material(s).

In some alternate embodiments the apparatus can comprise a rigid, semi-rigid and/or flexible element 132 coupled with a lower component of the pair of flexible shells 122, lower bar 126 and/or bottom panel 118 wherein such rigid, semi-rigid and/or flexible element 132 has an enlarged feature 134 at its distal end. In some embodiments the enlarged feature 134 can be adapted and configured such that it can selectively engage with a complimentary component to mechanically open the flexible shells 122 as the device is moving relative to the complimentary component. In some embodiments, the flexible element 132 can be coupled with a lower bar 126 or a bottom panel 118, and/or any other know, convenient and/or desired component and/or at any known, convenient and/or desired location.

Figure 1B:
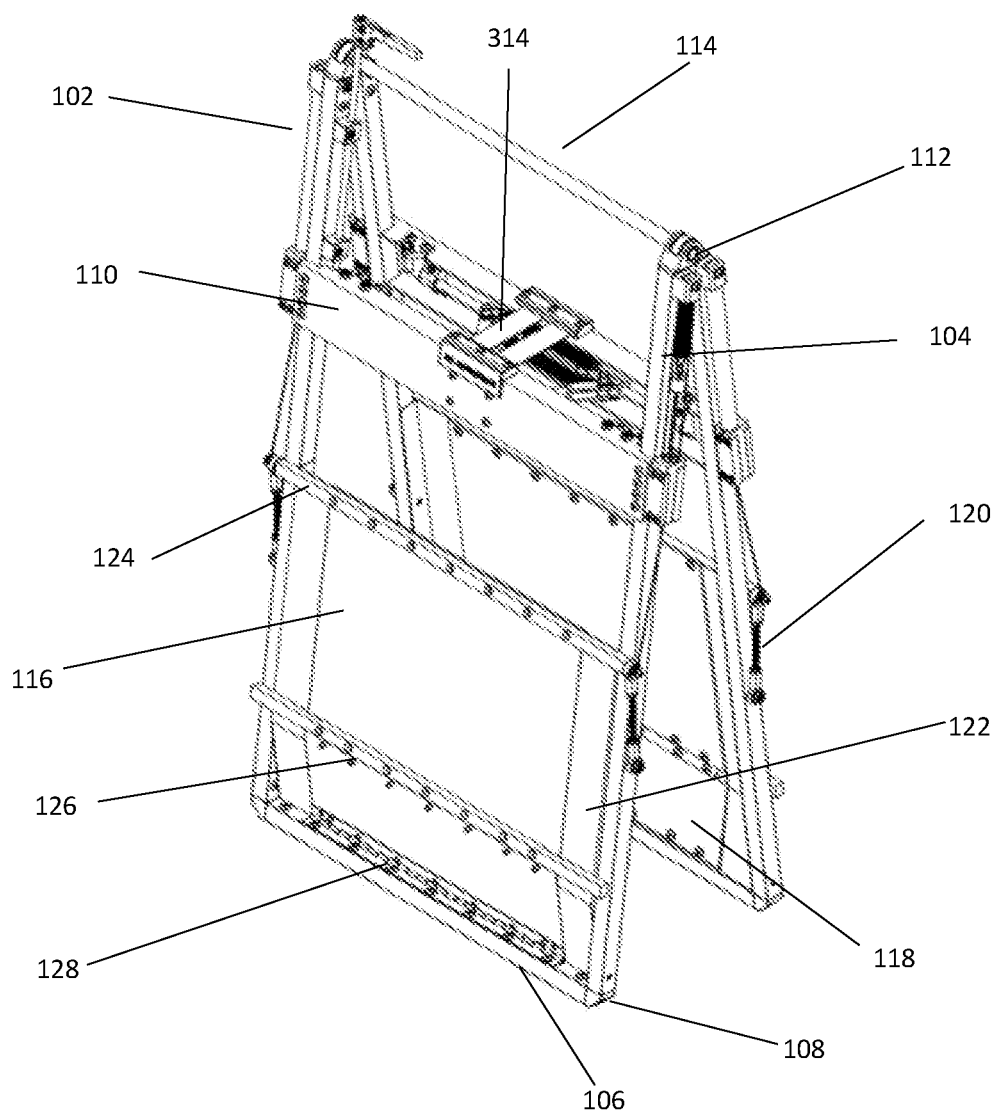
FIG. 1b depicts a perspective view of an embodiment of the present device. in a second configuration.
Figure 5:
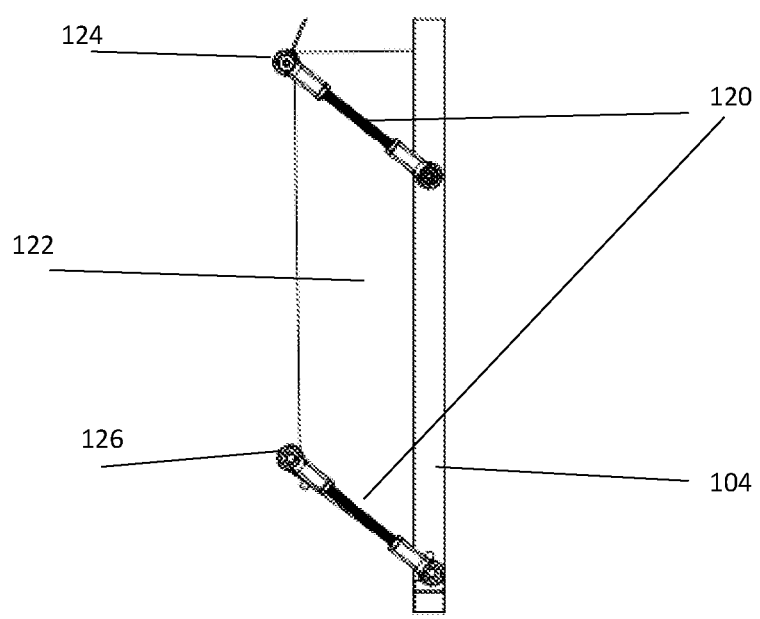
FIG. 5 depicts a side detail view of an alternative embodiment of a link arm and flexible shell configuration.

FIG. 1b depicts a perspective view of a second configuration of the present device in a second configuration, which can be regarded as "open". As shown in FIG. 1a and 1b, each of the two frames 102 can have a vertical panel 116, a bottom panel 118, a pair of link arms 120, and a pair of flexible shells 122 fastened to it to contain a payload. Vertical panels 116 and bottom panels 118 can have a substantially rectangular geometry, but in other configurations can have any other known, convenient and/or desired configuration, and can be comprised of metal, polymer, and/or any other know, convenient and/or desired material(s). In some embodiments a bottom panel 118 can be approximately 13 inches wide and approximately 4 inches tall, but in other embodiments can have any other known, convenient and/or desired dimensions. As shown in FIG. 1b a bottom panel 118 can fasten with a hinge 128 to the bottom horizonal member 106 of a frame 102. A vertical panel 116 can be approximately 13 inches wide and approximately 10 inches tall and/or any other know, convenient and/or desired dimensions and can fasten with a hinge 126 to the top edge of a bottom panel 118. The top and bottom edges of a vertical panel 116 can have a top bar 124 mounted that can span the width of a frame 102, the ends of which can be fastened to the vertical members 104 of a frame 102. In some embodiments link arms 120 can removably connect a bar top 124 to vertical members 104 and can pivot on each end. The open corner can be filled with flexible shells 122 that can attach with hook-and-loop and/or any other know, convenient and/or desired fasteners to a frame 102 and panels 116 118. The flexible shells 122 in the corners can be constructed as such that no pockets or recesses are formed and a payload of any size can slide freely from the carrier if opened. In some embodiments, flexible shells 122 can be comprised of fabric, polymer, and/or any other know, convenient and/or desired flexible and/or elastic material(s). Alternatively, the vertical panel 116, bottom panel 118, and hinges 126/128 can be combined with flexible shells 122 to form a single flexible/semi flexible shell mounted to frame 102. In some embodiments, An additional link arm 120 can be attached to the lower bar 124 (as depicted in FIG. 5).

Figure 1C:
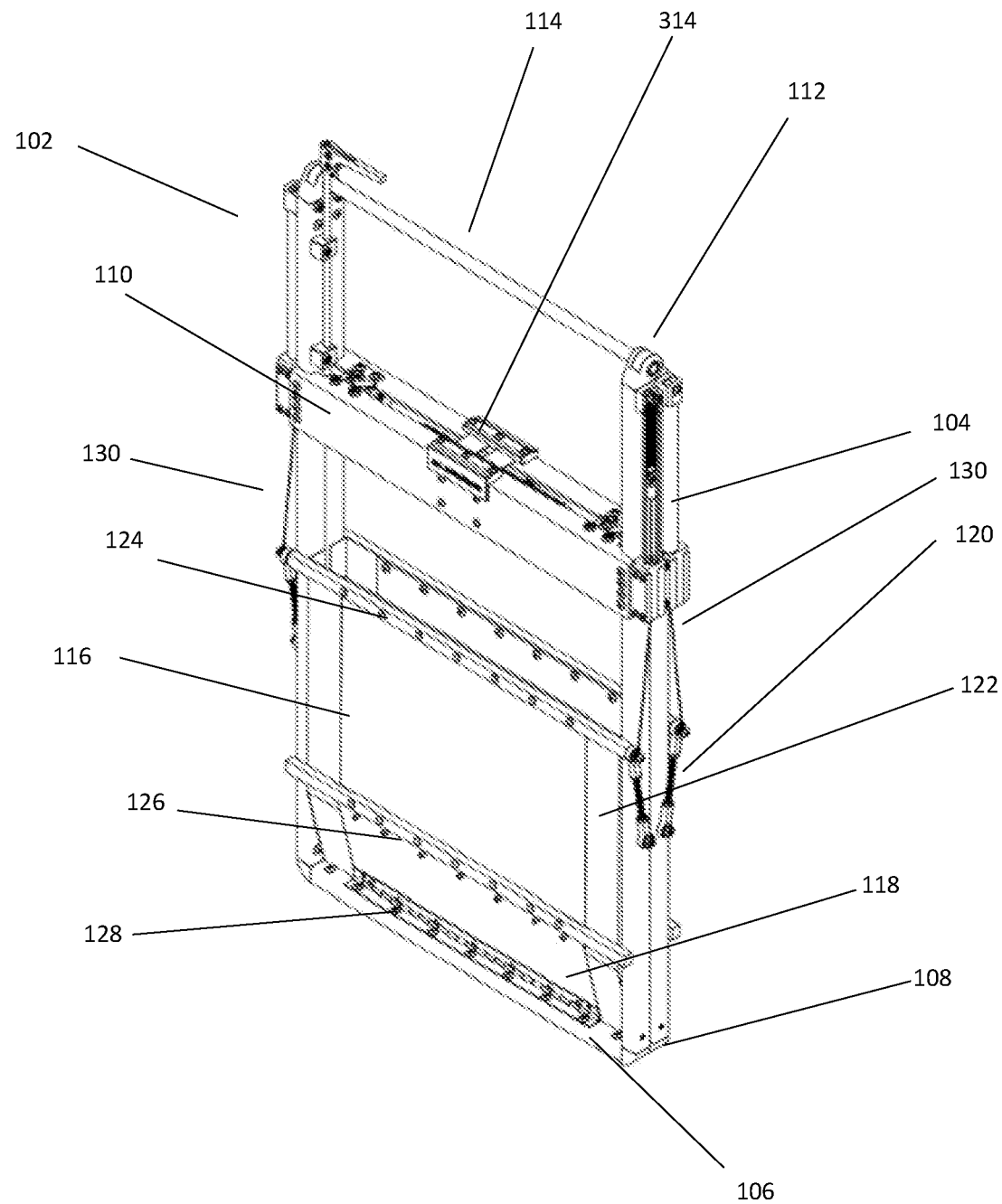
FIG. 1c depicts a perspective view of an embodiment of the present device. in a third configuration.

FIG. 1c depicts a perspective view of an embodiment of the current device in a third configuration that can be regarded as "closed". In operation, the device 100 can be loaded with an item when in a first loaded and closed configuration then the item can be transported by the system to a second location. Upon reaching the unload location, the frames 102 of the device 100 can be triggered to separate rapidly thus releasing the contents of the device 100 without applying any or significant torsional/rotational force to the contents and enabling vertical and/or substantially vertical drop of the contents.

Figure 2:
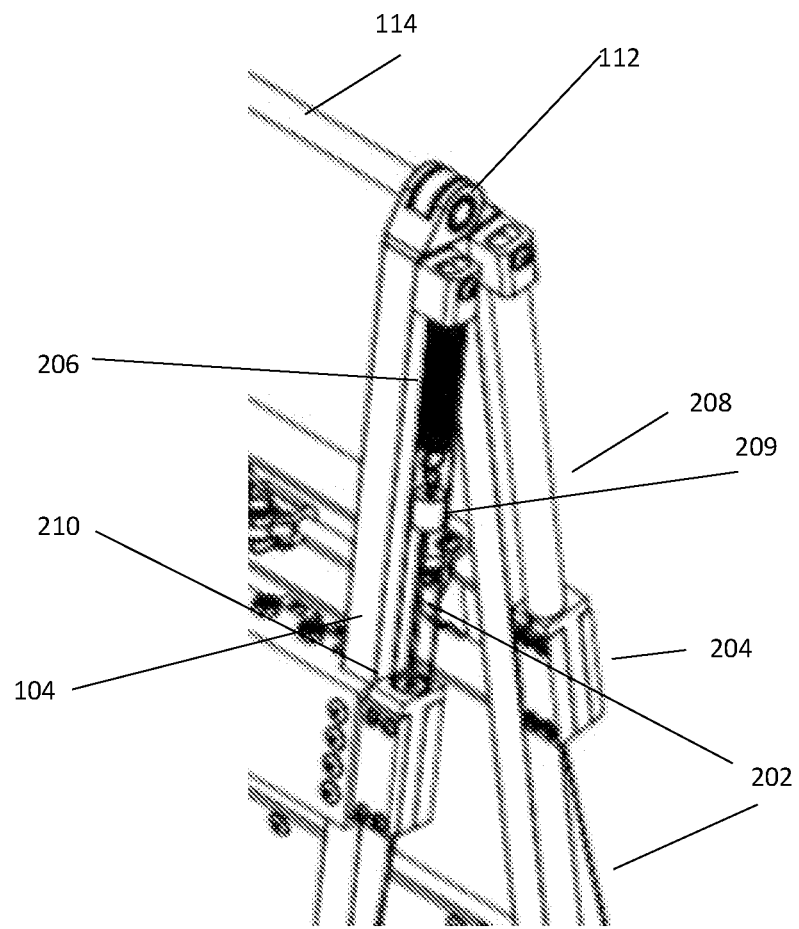
FIG. 2 depicts a perspective detail view of an embodiment of the present device.

FIG. 2 depicts a perspective detail view with a cutaway of an embodiments of the present device 100. A cable 202 (or other connector element which can be rigid, flexible and/or semi-rigid) can attach to each end of a top panel bar 124 and can be routed up through a guide block 204 mounted to the side of the frame 104 and to a biasing member 206 running vertical along the frame tube, which can be contained within an enclosure 208. In some embodiments, an enclosure 208 can be a round aluminum tube, but in other embodiments can have any other known, convenient and/or desired configuration and be comprised of any other known, convenient and/or desired material(s). A cable 202, or any other connector element, can also have a stop 209 swagged on that can impact bumper stop 210 on top of a cable guide block 204 to limit travel of a vertical panel 116. Again, in operation, the device 100 can be loaded with an item when in a first loaded and closed configuration then the item can be transported by the system to a second location. Upon reaching the unload location, the frames 102 of the device 100 can be triggered to separate rapidly thus releasing the contents of the device 100 without applying any or significant torsional/rotational force to the contents and enabling vertical and/or substantially vertical drop of the contents.

Figure 3A:
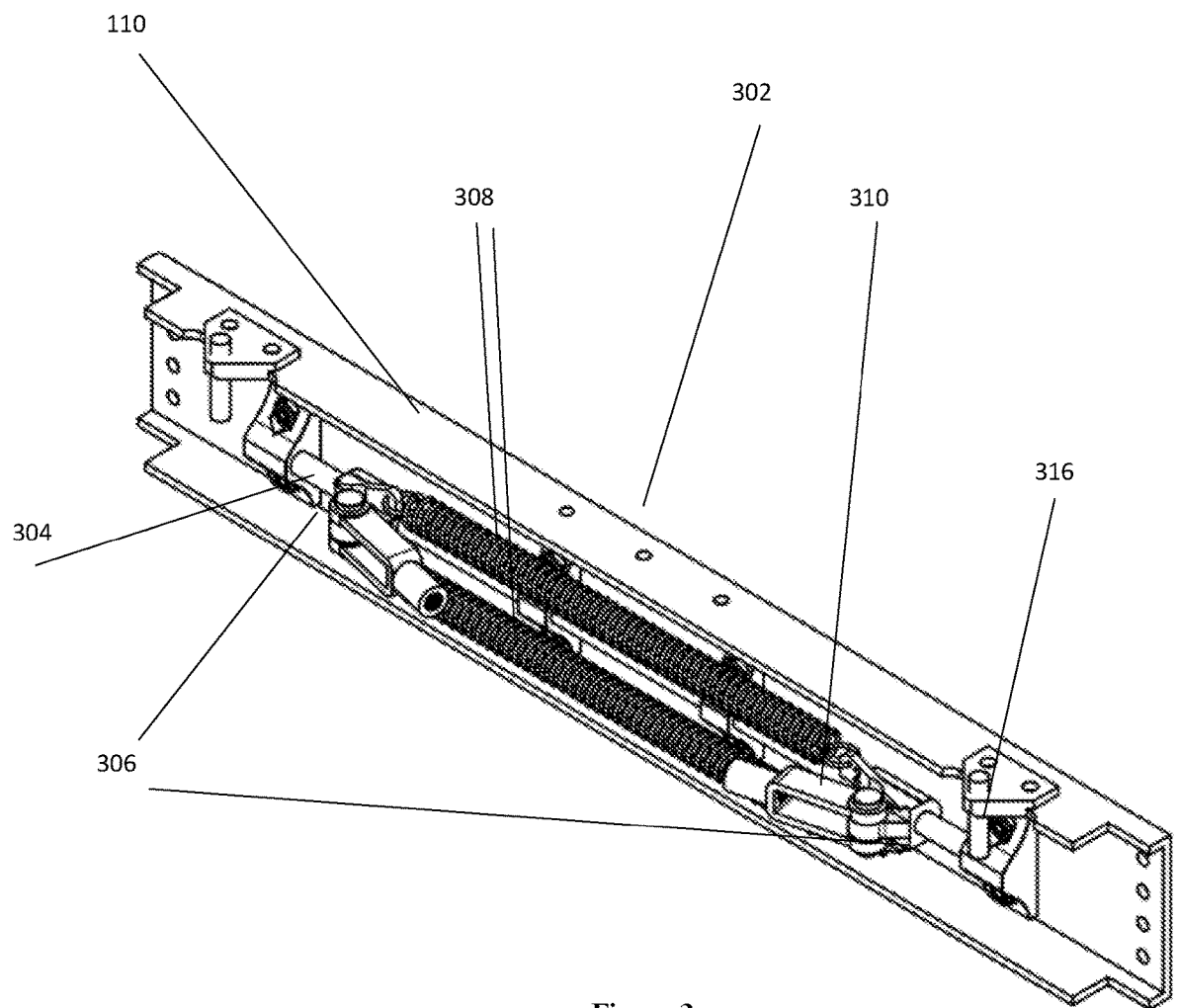
FIG. 3a depicts a perspective detail view of an embodiment of the present device.
Figure 3B:
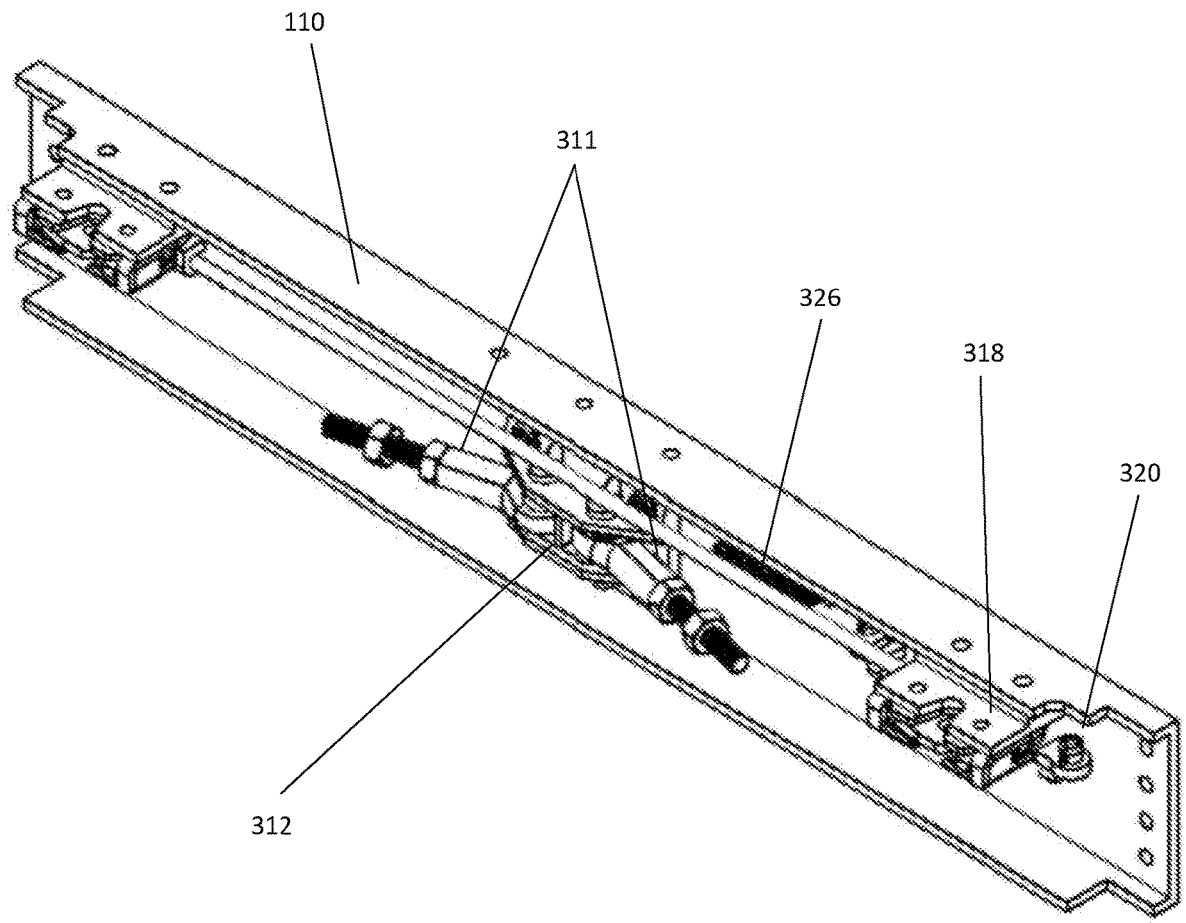
FIG. 3b depicts a perspective detail view of an embodiment of the present device.
Figure 3C:
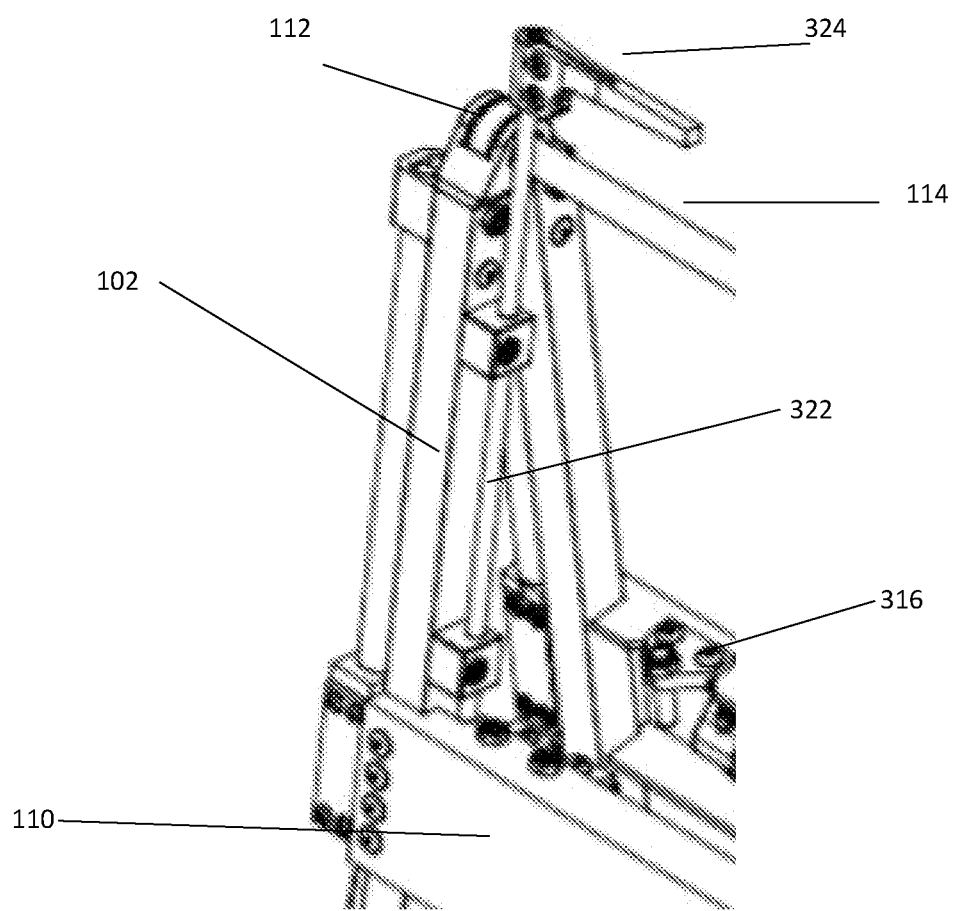
FIG. 3c depicts a perspective detail view of the external mechanism of a spring actuator system.

FIGS. 3a-3c depict a perspective detail of a spring actuator system 302. As shown in FIG. 3a, the two opposing pieces of channel 110 on frame 102 can house a spring actuator system 302. One side of a spring actuator system 302 can have a length of a linear bearing element 304 running along a channel 110. In some embodiments, linear bearing element 304 can guide a pair of slider blocks 306 that can be pulled towards one another by a pair of biasing members 308 mounted between them and can each have a clevis arm 310 attached to them. In the embodiment depicted, the linear bearing element 304 is depicted as having a round cross-sectional geometry, however in alternate embodiments, the linear bearing element 304 can have any known, convenient and/or desired cross-sectional geometry. Clevis arms 310 can be attached to the middle of the opposite channel 110 with two rod ends on two pins 311 or via any other known, convenient and/or desired connector held in a housing 312. In other embodiments, any other known, convenient and/or desired sliding or rolling bearing surfaces can be used. A biasing member's 308 resting state can push frames 102 apart against a strap 314 mounted across the two channels 110 to limit travel (as shown in FIG.

1a). In operation, pushing frames 102 together can extend biasing members 308 in tension.

FIG. 3b depicts a perspective detail view of the opposite channel 110 as that shown in FIG. 3a. Each of the opposing horizontal channels 110 can hold half of a latching mechanism, one side the striker pins 316 and release mechanism and the other the latches 318. In operation, when frames 102 are brought together striker pins 316 can engage in latches 318 and keep frames 102 parallel to one another with the actuator biasing members 308 in tension. Each latch 318 can be connected by a small linkage 320 to a torsion tube 322 running vertically up a frame 102. In alternate embodiments a torsion tube 322 can be any known, convenient and/or desired linkage element. In some embodiments, the latch 318 and striker pins 316 can be replaced with any known, convenient and/or desired latching device and/or mechanism.

FIG. 3c depicts a perspective detail view of the external mechanism of a spring actuator system 302. As shown in FIG. 3c, the top of a torsion tube 322 can extend above the hinge pivot member 114 of a frame 102 and can have a flag 324 mounted at the top. In operation, when a flag 324 strikes a tripper mechanism on a track system, it can twist a torsion tube 322, which can release latches 318 via a linkage 320, and the actuator biasing members 308 can push frames 102 open. A spring 326 on a linkage 320 can facilitate resetting latches 318 and flag 324 to their neutral position.

Figure 4A:
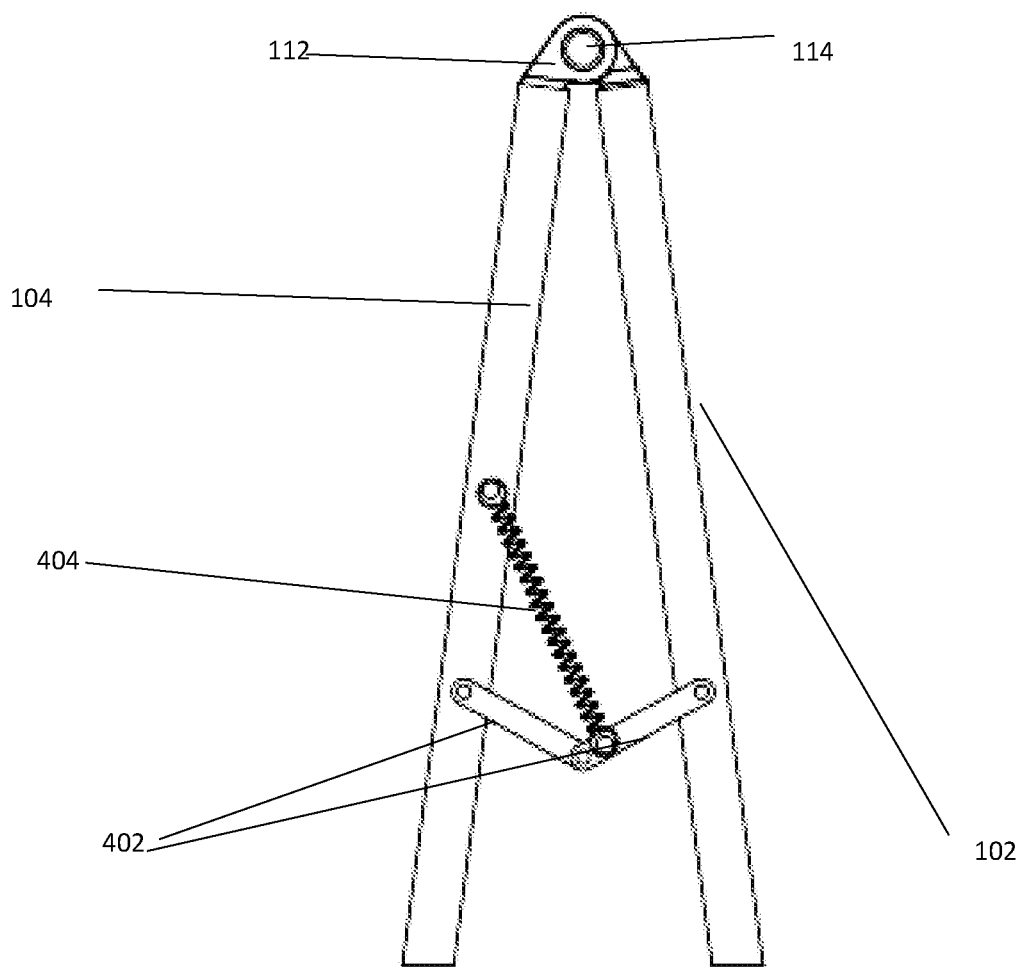
FIG. 4a depicts a side detail view of an alternate embodiment of a spring actuator system.

FIG. 4a depicts a side detail view of an alternate embodiment of a spring actuator system. In some embodiments, a spring actuator system can comprise at least one linkage 402 that can be removably pivotally connected to a vertical member 104. As shown in FIG. 4a, embodiments having two linkages 402 can be removably, fixedly and/or semi-permanently pivotally connected to each other between frames 102. A biasing member 404 can have one end removably connected to a linkage 402 and the opposite end removable coupled to a vertical member 104. In operation, in some embodiments, a biasing member 404 can be in tension when frames 102 are opened away from each other, but in other embodiments can have any other known, convenient and/or desired configuration.

Figure 4B:
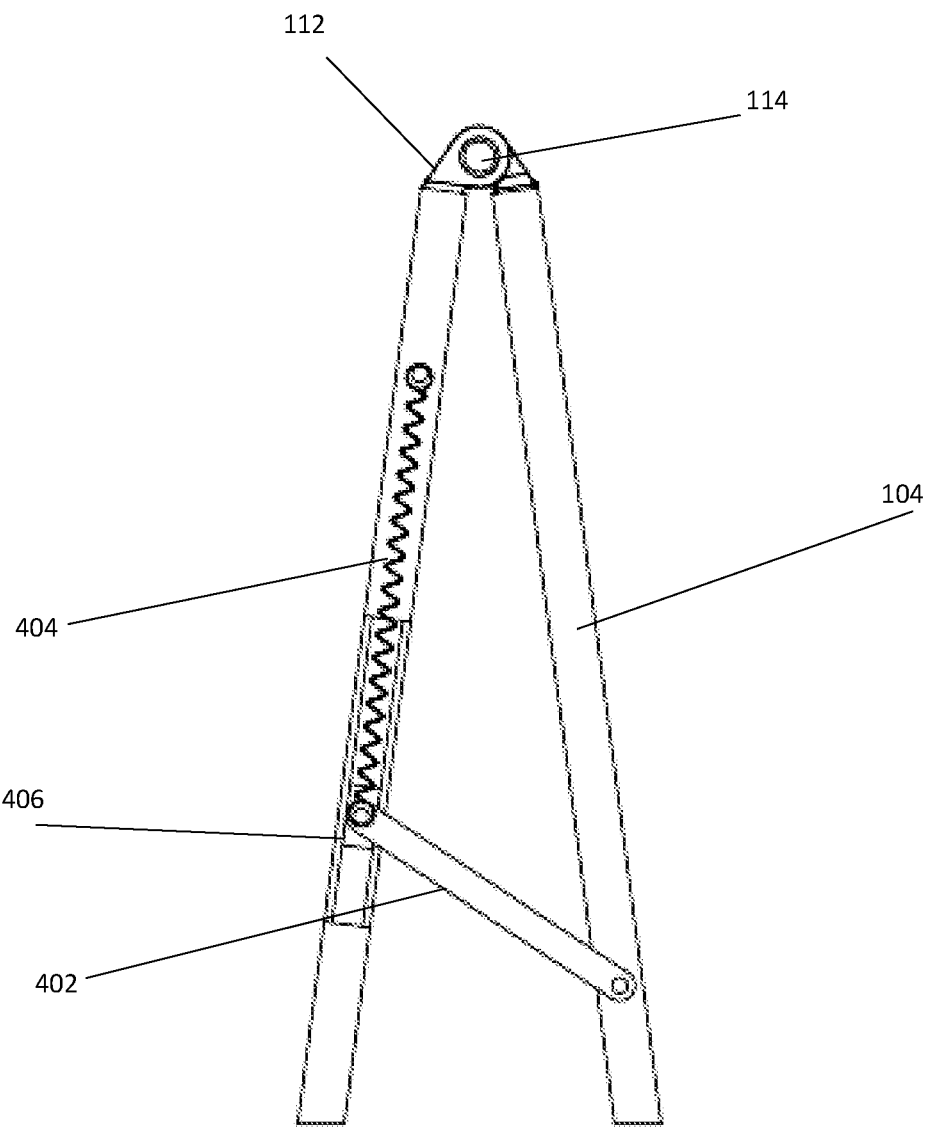
FIG. 4b depicts a side detail view of an alternate embodiment of a spring actuator system.

FIG. 4b depicts a side detail view of an alternate embodiment of a spring actuator system 302. In the embodiment shown, a single linkage 402 can have a first end removably, permanently and/or semi-permanently pivotally connected to a vertical member 104 of a first frame 102, and a second end removably, permanently and/or semi-permanently pivotally connected to a sliding block 406. A sliding block 406 can be mounted in or on an opposite frame 102. A biasing member 404 can have a first end removably, permanently and/or semi-permanently connected to a sliding block 406 and the second end of a linkage 402, and the second end can be removably, permanently and/or semi-permanently connected along a vertical member 104. In operation, in some embodiments, a biasing member 404 can be in tension when frames 102 are opened away from each other, but in other embodiments can have any other known, convenient and/or desired configuration.

Figure 4C:
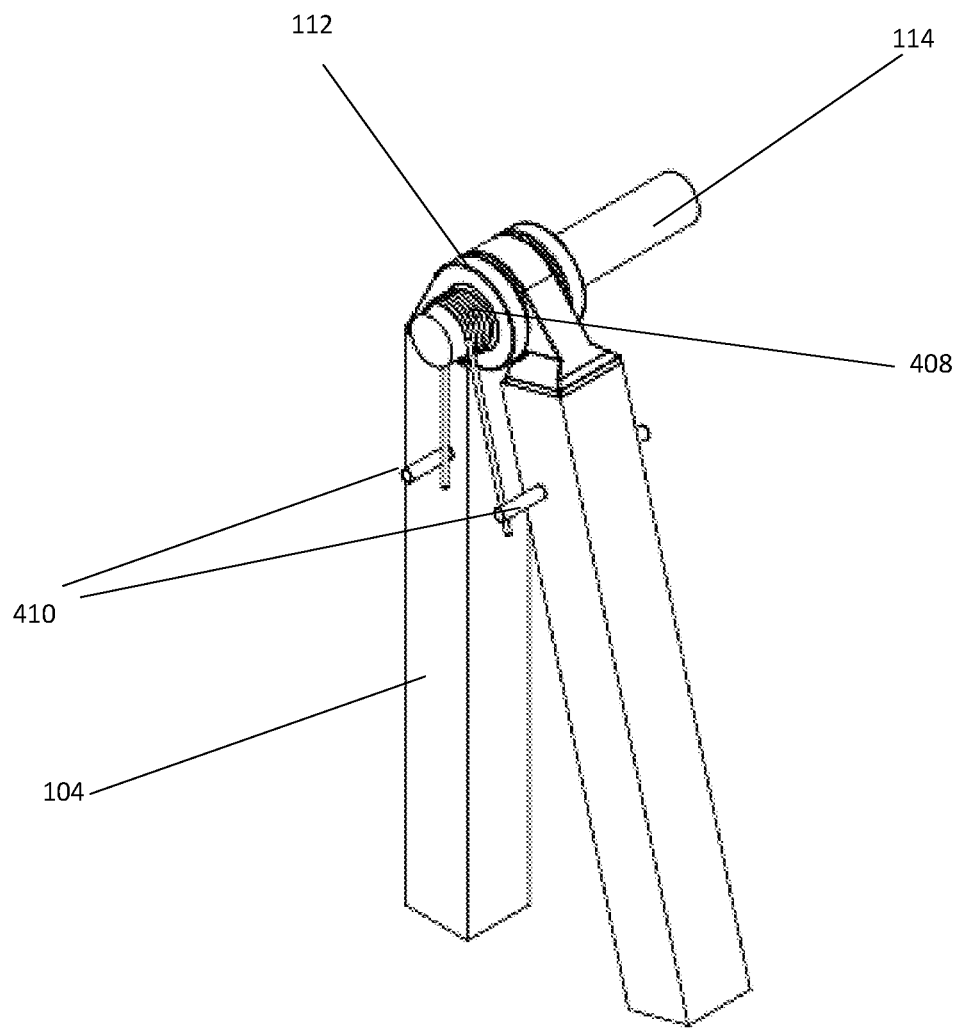
FIG. 4c depicts a perspective detail view of an alternate embodiment of a spring actuator system.

FIG. 4c depicts a perspective detail view of an alternate embodiment of a spring actuator system 302. In the embodiments depicted in FIG. 4c, a torsional biasing member 408 can be located substantially concentrically on an end of a pivot member 114. As shown in FIG. 4c, a torsional biasing member 408 can be coiled around an end of a pivot member 114 with terminal ends extending substantially parallel to vertical members 104. Pins 410 can extend substantially perpendicular to vertical members 104 proximal to a hinge joint 112. As shown in FIG. 4c, terminal ends of a torsional biasing member 408 can rest against or be removably, permanently and/or semi-permanently connected to pins 410. In operation, in some embodiments, a torsional biasing member 408 can be in tension when frames 102 are opened away from each other, but in other embodiments can have any other known, convenient and/or desired configuration.

FIG. 5 depicts a side detail view of an alternative embodiment of a link arm 120 and flexible shell 122 configuration. In some embodiments, a flexible shell 122 can be a one-piece enclosure extending between frames 102 and removably connected to a top bar 124 and a lower bar 126. As shown in FIG. 5, one of a pair of link arms 120 can be removably connected to the top outer corner of a flexible shell 122 (and a top bar 124) and a vertical member 104. A second pair of link arms 120 can be removably connected to the lower outer corner of a flexible shell 122 (and a lower bar 126).

In use, the present device 100 can be connected to an existing overhead track system. When first presented at an induction station the present device can be in a closed position with the pair of frames 102 parallel to one another and the sides can be closed against the frame 102. An operator (a person or robotic system) can scan a payload into a computer, then pull one or both sides away from frames 102 to create a large opening to place a payload within. In the case of a human operator this opening operation can be by hand or by a button/foot pedal/switch that can actuates an additional mechanism interfacing with the carrier. However, in some automated embodiments, the system 302 can be automatically actuate an additional mechanism interfacing with the carrier via any known, convenient and/or desired system and/or mechanism. The side wall(s) can then be released, and the biasing members 206 can pull the side wall(s) back to conform to the width of the payload within, or the size of the frame in the case of a thin payload. This can allow for a higher density of carriers on a rail in an overhead track system for staging and storage and can also ensure that a payload is centered within the carrier. In some embodiments, an operator can confirm to a computer or the computer can automatically detect that a payload has been inducted and the overhead track system can take the carrier away and present a new, empty carrier to the operator.

Upon arriving at a destination, the carrier does not stop but rather can be opened while in motion over a drop point by a tripper mechanism designated to that drop point. The spring actuator system 302 can accelerate frames 102 and bottom panel 118 faster than gravity accelerates a payload downward. Because bottom panels 118 on which a payload is resting on are at an angle and not parallel to the direction of motion, they can pull away from a payload instead of sliding along it. A payload can be near instantly in a free fall, without contact with the carrier, ensuring or facilitating a payload to drop or fall in a vertical or near vertically and/or in a very predictable manner: straight down relative to the carrier without any tumbling. Mechanisms used by others rely on the payloads pushing through a trap door falling by gravity or by sliding off a tilting surface which can be highly variable for small changes in payload size, weight, and friction coefficients. In operation, the rapid transition of the at least two frames from a first state to a second state can be such that a payload is not subject to significant frictional forces which can subject the payload to rotational or torsional forces.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A payload transport carrier, comprising:
   at least two frames, wherein each frame is further comprised of
   a pair of vertical members each having a first end and a second end;
   a horizonal member connecting the first ends of said vertical members to form a substantially orthogonal U-shaped frame; and
   a channel connected substantially horizontally between said vertical members;
   wherein each frame contains a vertical panel and a bottom panel connected to said frame via top and bottom substantially horizontal bars traversing each said frame;
   a biasing element coupled with each of said at least two frames,
   a flexible pair of shells fastened to each of said at least two frames;
   a connector element attached to each end of said top horizontal bar;
   a spring actuator system adapted to rapidly transition said at least two frames from a first configuration to a second configuration; and
   a linkage element having a top end and a bottom end.

2. The payload transport carrier of claim 1 wherein said at least two frames are complimentary.

3. The payload transport carrier of claim 2 wherein said at least two frames are substantially matching.

4. The payload transport carrier of claim 3 wherein said at least two frames are pivotally connected at the second ends of the vertical members of each of said at least two frames.

5. The payload transport carrier of claim 1 wherein said connector element is routed up via a guide block mounted to a side of each of said at least two frames and to said biasing member.

6. The payload transport carrier of claim 5 wherein said biasing member runs vertically along at least one of said at least two frames.

7. The payload transport carrier of claim 5 wherein said connector element is a cable.

8. The payload transport carrier of claim 7 wherein each said biasing member is contained within a tube.

9. The payload transport carrier of claim 8 wherein said first configuration is a closed configuration adapted and configured to facilitate deposit of a payload between said at least two frames.

10. The payload transport carrier of claim 9 wherein said second configuration is an open configuration adapted and configured to facilitate vertical drop of a payload from between said at least two frames.

11. The payload transport carrier of claim 10 wherein said rapid transition of said at least two frames from a first configuration and a second configuration is such that a payload is dropped absent application of significant rotational or torsional force to said payload.

12. The payload transport carrier of claim 11 wherein said frame second end is coupled with a flag component adapted and configured to, at least in part, trigger the transition of the at least two frames.

13. The payload transport carrier of claim 10 wherein said rapid transition of said at least two frames from a first configuration and a second configuration is such that a payload is not subject to significant frictional forces.

* * * * *